(12) United States Patent
Ando et al.

(10) Patent No.: US 11,244,155 B2
(45) Date of Patent: Feb. 8, 2022

(54) INFORMATION PROCESSING SYSTEM

(71) Applicant: FUJIFILM BUSINESS INNOVATION CORP., Tokyo (JP)

(72) Inventors: Jun Ando, Kanagawa (JP); Shinya Nakamura, Kanagawa (JP); Tadao Michimura, Kanagawa (JP); Norio Yamamoto, Kanagawa (JP); Naoyuki Enomoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/878,688

(22) Filed: May 20, 2020

(65) Prior Publication Data

US 2021/0110155 A1  Apr. 15, 2021

(30) Foreign Application Priority Data

Oct. 10, 2019 (JP) .............................. JP2019-186971

(51) Int. Cl.
*G06K 9/62* (2006.01)
*G06K 9/00* (2022.01)

(52) U.S. Cl.
CPC ..... *G06K 9/00483* (2013.01); *G06K 9/00463* (2013.01); *G06K 9/6215* (2013.01)

(58) Field of Classification Search
CPC . G06K 9/00442–00483; G06K 9/6215; G06K 2009/00489
See application file for complete search history.

(56) References Cited

U.S. PATENT DOCUMENTS

| | | | |
|---|---|---|---|
| 9,542,669 B1 * | 1/2017 | Browning | G06Q 10/109 |
| 10,552,536 B2 * | 2/2020 | Stanton | G06K 9/6215 |
| 10,922,719 B1 * | 2/2021 | Bergstrom | G06Q 30/0257 |
| 2002/0059222 A1 * | 5/2002 | Sasaki | G06Q 10/10 |
| 2003/0079184 A1 * | 4/2003 | Berger | G07C 9/37 |
| | | | 715/255 |
| 2003/0182310 A1 * | 9/2003 | Charnock | G06Q 10/10 |
| 2006/0026231 A1 * | 2/2006 | Degenhardt | G06Q 10/10 |
| | | | 709/204 |
| 2006/0155513 A1 * | 7/2006 | Mizrahi | G06Q 30/02 |
| | | | 702/179 |
| 2006/0271526 A1 * | 11/2006 | Charnock | G06Q 30/02 |
| 2008/0158261 A1 * | 7/2008 | Gould | G11B 27/28 |
| | | | 345/666 |

(Continued)

FOREIGN PATENT DOCUMENTS

| | | |
|---|---|---|
| JP | 6142616 B2 | 6/2017 |
| WO | 2017/141338 A1 | 8/2017 |

*Primary Examiner* — Sean T Motsinger
(74) *Attorney, Agent, or Firm* — Oliff PLC (57) ABSTRACT

An information processing system includes a processor configured to analyze an obtained document, the processor being configured to: obtain plural documents where information to be shared by plural participants is recorded; calculate a degree of similarity in details in units of blocks between different documents, the blocks being blocks of sentences included in the documents; determine an execution order of executing work of sharing details of each of the blocks on the basis of the degree of similarity; and allocate work time for performing the work of sharing details of each of the blocks on the basis of a number of characters in each of the blocks.

11 Claims, 9 Drawing Sheets

(56) References Cited

U.S. PATENT DOCUMENTS

| | | | |
|---|---|---|---|
| 2012/0060082 A1* | 3/2012 | Edala | G06F 16/36 |
| | | | 715/231 |
| 2012/0278388 A1* | 11/2012 | Kleinbart | G06Q 10/10 |
| | | | 709/204 |
| 2013/0027428 A1* | 1/2013 | Graham | H04L 51/32 |
| | | | 345/633 |
| 2013/0066750 A1* | 3/2013 | Siddique | G06Q 30/0601 |
| | | | 705/27.2 |
| 2014/0039887 A1* | 2/2014 | Dzik | G06F 16/4393 |
| | | | 704/235 |
| 2014/0297641 A1* | 10/2014 | Mayumi | G06Q 10/10 |
| | | | 707/737 |
| 2015/0012805 A1* | 1/2015 | Bleiweiss | G06F 16/93 |
| | | | 715/205 |
| 2015/0142888 A1* | 5/2015 | Browning | H04L 67/22 |
| | | | 709/204 |
| 2015/0263978 A1* | 9/2015 | Olson | G06F 3/061 |
| | | | 709/226 |
| 2017/0178265 A1* | 6/2017 | Hwang | G09B 5/00 |
| 2018/0032608 A1* | 2/2018 | Wu | G06F 40/194 |
| 2018/0268253 A1* | 9/2018 | Hoffman | G06K 9/6218 |
| 2018/0322073 A1* | 11/2018 | Hida | G06Q 50/10 |
| 2019/0019022 A1* | 1/2019 | Marda | G06K 9/00483 |
| 2019/0147402 A1* | 5/2019 | Sitrick | H04M 3/567 |
| | | | 705/301 |
| 2021/0026897 A1* | 1/2021 | Rathje | G06F 16/3344 |
| 2021/0065320 A1* | 3/2021 | Bleiweiss | G06K 9/6257 |
| 2021/0067475 A1* | 3/2021 | Chen | H04L 12/1818 |
| 2021/0110155 A1* | 4/2021 | Ando | G06K 9/6215 |
| 2021/0117714 A1* | 4/2021 | Yang | G06K 9/6256 |

* cited by examiner

| DOCUMENT | PARAGRAPH | A 1 | A 2 | A 3 | B 1 | B 2 | B 3 | C 1 | C 2 | C 3 | D 1 | D 2 | D 3 | E 1 | E 2 | E 3 |
|---|---|---|---|---|---|---|---|---|---|---|---|---|---|---|---|---|
| A | 1 |  |  |  | 0.97 | 0.43 | 0.98 | 0.96 | 0.99 | 0.79 | 0.76 | 0.88 | 0.55 | 0.63 | 0.56 | 0.19 |
| A | 2 |  |  |  | 0.23 | 0.31 | 0.18 | 0.91 | 0.13 | 0.10 | 0.63 | 0.96 | 0.65 | 0.54 | 0.60 | 0.25 |
| A | 3 |  |  |  | 0.62 | 0.07 | 0.99 | 0.46 | 0.37 | 0.58 | 0.67 | 0.60 | 0.68 | 0.27 | 0.99 | 0.09 |
| B | 1 | 0.97 | 0.23 | 0.62 |  |  |  | 0.41 | 0.79 | 0.58 | 0.74 | 0.03 | 0.56 | 0.49 | 0.41 | 0.70 |
| B | 2 | 0.43 | 0.31 | 0.07 |  |  |  | 0.78 | 0.36 | 0.71 | 0.52 | 0.09 | 0.53 | 0.59 | 0.08 | 0.58 |
| B | 3 | 0.98 | 0.18 | 0.99 |  |  |  | 0.01 | 0.11 | 0.97 | 0.91 | 0.68 | 0.07 | 0.88 | 0.64 | 0.13 |
| C | 1 | 0.96 | 0.91 | 0.46 | 0.41 | 0.78 | 0.01 |  |  |  | 0.79 | 0.98 | 0.40 | 0.12 | 0.05 | 0.38 |
| C | 2 | 0.99 | 0.13 | 0.37 | 0.79 | 0.36 | 0.11 |  |  |  | 0.80 | 0.83 | 0.10 | 0.70 | 0.26 | 0.51 |
| C | 3 | 0.79 | 0.10 | 0.58 | 0.58 | 0.71 | 0.97 |  |  |  | 0.66 | 0.40 | 0.01 | 0.15 | 0.45 | 0.83 |
| D | 1 | 0.76 | 0.63 | 0.67 | 0.74 | 0.52 | 0.91 | 0.79 | 0.80 | 0.66 |  |  |  | 0.06 | 0.57 | 0.14 |
| D | 2 | 0.88 | 0.96 | 0.60 | 0.03 | 0.09 | 0.68 | 0.98 | 0.83 | 0.40 |  |  |  | 0.90 | 0.56 | 0.61 |
| D | 3 | 0.55 | 0.65 | 0.68 | 0.56 | 0.53 | 0.07 | 0.40 | 0.10 | 0.01 |  |  |  | 0.52 | 0.81 | 0.83 |
| E | 1 | 0.63 | 0.54 | 0.27 | 0.49 | 0.59 | 0.88 | 0.12 | 0.70 | 0.15 | 0.08 | 0.90 | 0.52 |  |  |  |
| E | 2 | 0.56 | 0.60 | 0.99 | 0.41 | 0.08 | 0.64 | 0.05 | 0.26 | 0.45 | 0.57 | 0.56 | 0.81 |  |  |  |
| E | 3 | 0.19 | 0.25 | 0.09 | 0.70 | 0.58 | 0.13 | 0.38 | 0.51 | 0.83 | 0.14 | 0.61 | 0.83 |  |  |  |

| DOCUMENT | PARAGRAPH | A | B | C | D | E | MINIMUM DEGREE OF SIMILARITY |
|---|---|---|---|---|---|---|---|
| A | 1 |  | 0.99 | 0.99 | 0.88 | 0.63 | 0.63 |
| A | 2 | 0.97 | 0.31 | 0.91 | 0.96 | 0.60 | 0.31 |
| A | 3 | 0.43 | 0.99 | 0.58 | 0.68 | 0.99 | 0.58 |
| B | 1 | 0.99 |  | 0.79 | 0.74 | 0.70 | 0.70 |
| B | 2 | 0.96 | 0.78 | 0.78 | 0.53 | 0.59 | 0.43 |
| B | 3 | 0.99 | 0.79 | 0.97 | 0.91 | 0.88 | 0.88 |
| C | 1 | 0.79 | 0.97 |  | 0.98 | 0.38 | 0.38 |
| C | 2 | 0.76 | 0.91 | 0.80 | 0.83 | 0.70 | 0.70 |
| C | 3 | 0.96 | 0.68 | 0.98 | 0.66 | 0.83 | 0.66 |
| D | 1 | 0.68 | 0.56 | 0.40 |  | 0.57 | 0.57 |
| D | 2 | 0.63 | 0.88 | 0.70 | 0.90 | 0.90 | 0.68 |
| D | 3 | 0.99 | 0.64 | 0.45 | 0.81 | 0.83 | 0.40 |
| E | 1 |  |  |  |  |  | 0.63 |
| E | 2 | 0.99 | 0.70 | 0.83 | 0.83 |  | 0.45 |
| E | 3 | 0.25 |  |  |  |  | 0.25 |

FIG. 7

| DOCUMENT | PARAGRAPH | DEGREE OF SIMILARITY | NUMBER OF CHARACTERS | ALLOCATED TIME | WORK TIME | CUMULATIVE TIME |
|---|---|---|---|---|---|---|
| E | 3 | 0.25 | 305 | 91.6 | 100 | 100 |
| A | 2 | 0.31 | 218 | 65.3 | 70 | 170 |
| C | 1 | 0.38 | 365 | 109.6 | 110 | 280 |
| D | 3 | 0.40 | 341 | 102.2 | 110 | 380 |
| B | 2 | 0.43 | 231 | 69.2 | 70 | 450 |
| E | 2 | 0.45 | 380 | 114.0 | 120 | 560 |
| D | 1 | 0.57 | 391 | 117.2 | 120 | 680 |
| A | 3 | 0.58 | 515 | 154.6 | 160 | 830 |
| A | 1 | 0.63 | 174 | 52.2 | 60 | 880 |
| E | 1 | 0.63 | 253 | 76.0 | 80 | 960 |
| C | 3 | 0.66 | 237 | 71.0 | 80 | 1030 |
| D | 2 | 0.68 | 438 | 131.4 | 140 | 1160 |
| B | 1 | 0.70 | 260 | 78.1 | 80 | 1240 |
| C | 2 | 0.70 | 168 | 50.4 | 60 | 1290 |
| B | 3 | 0.88 | 393 | 117.8 | 120 | 1410 |

FIG. 8

| ANALYSIS RESULT | FACILITATION | | |
|---|---|---|---|
| ORDER OF PRIORITY | DOCUMENT | PARAGRAPH | WORK TIME (SECONDS) |
| 1 | FX28816 | 1 | 100 |
| 2 | FX28860 | 2 | 70 |
| 3 | FX29801 | 2 | 110 |
| 4 | FX30001 | 2 | 110 |
| 5 | FX28860 | 1 | 70 |
| 6 | FX28860 | 3 | 120 |
| 7 | FX29801 | 3 | 120 |
| 8 | FX28816 | 3 | 160 |
| 9 | FX30001 | 1 | 60 |

FIG. 10

INFORMATION PROCESSING SYSTEM

CROSS-REFERENCE TO RELATED APPLICATIONS

This application is based on and claims priority under 35 USC 119 from Japanese Patent Application No. 2019-186971 filed Oct. 10, 2019.

BACKGROUND

(i) Technical Field

The present disclosure relates to an information processing system.

(ii) Related Art

Discussions in group work have been analyzed to provide information to participants of the work, thereby supporting the progress of the work.

International Publication No. 2017/141338 discloses the following: among a plurality of groups sharing information on a group by group basis, the degree of similarity between information shared in a first group and information shared in a second group is calculated, and, in the case where the calculated degree of similarity satisfies a certain reference, information for promoting discussions is provided to at least one of the first group and the second group on the basis of information shared in that group. An example of information for promoting discussions includes antonyms of representative words that characterize information shared in each group.

In group work, each participant is required to share information related to the work. However, in the case where information related to the work that is held by each participant varies from one to another, it is not easy to efficiently share information within a predetermined time period.

SUMMARY

Aspects of non-limiting embodiments of the present disclosure relate to providing an information processing system for efficiently advancing the work of sharing details that each participant of group work learned individually in advance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to analyze an obtained document, the processor being configured to: obtain a plurality of documents where information to be shared by a plurality of participants is recorded; calculate a degree of similarity in details in units of blocks between different documents, the blocks being blocks of sentences included in the documents; determine an execution order of executing work of sharing details of each of the blocks on the basis of the degree of similarity; and allocate work time for performing the work of sharing details of each of the blocks on the basis of a number of characters in each of the blocks.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the accompanying drawings.

System Configuration

Figure 1:
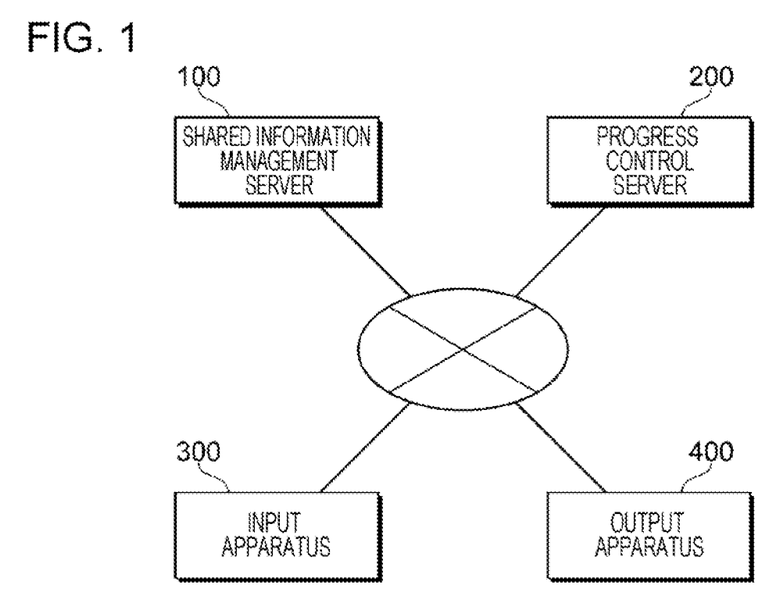
FIG. 1 is a diagram illustrating the overall configuration of an information processing system to which an exemplary embodiment is applied.

FIG. 1 is a diagram illustrating the overall configuration of an information processing system to which an exemplary embodiment is applied. The information processing system according to the present exemplary embodiment includes a shared information management server 100, a progress control server 200, an input apparatus 300, and an output apparatus 400.

The shared information management server 100 is a server that manages information to be shared by a plurality of participants participating in group work. An example of information to be shared, which is the target of management, includes details that each participant learned in advance about the group work. By sharing details that each participant learned in advance with other participants, each participant may implement the group work with common understanding.

The progress control server 200 is a server that controls and supports the progress of the work of sharing to-be-shared information, which is the target of management performed by the shared information management server 100, by participants (the work implemented for sharing information). Various types of work are conceivable as the work of sharing information, such as presentation within the group, distribution of materials, distribution of materials to a terminal of each participant of the group, and displaying of materials on a display device viewable by each participant of the group. In the present exemplary embodiment, an example of presenting details that each participant learned in advance will be described as the sharing work.

The input apparatus 300 is an apparatus for the participants of the group work to input information to be shared in the group. In the case where to-be-shared information is described in a particular description form, an image processing apparatus may be used as the input apparatus 300. The image processing apparatus includes a so-called scanner apparatus, which optically reads an image on a set document to generate a read image (image data). Exemplary image reading methods include the following: the charge-coupled device (CCD) method of reducing, with the use of a lens, the size of light that is emitted from a light source onto a document and that is reflected from the document, and receiving the size-reduced light with the use of CCDs; and the contact image sensor (CIS) method of receiving, with the use of a CIS, light beams that are sequentially emitted from a light-emitting diode (LED) light source onto a document and that are reflected from the document. An image processing apparatus has a communication function of connecting to the shared information management server 100 via a network and transmitting image data of a read description form. In addition, in the case where to-be-shared information is described in a document converted into electronic data (electronic document), an information processing apparatus that transmits the electronic document to the shared information management server 100 may be used as the input apparatus 300. Hereinafter, the case in which an image processing apparatus is used as the input apparatus 300 will be described. Therefore, to-be-shared information is sent as image data, which is obtained by reading an image by the input apparatus 300, to the shared information management server 100.

The output apparatus 400 is an apparatus that outputs presentation information presented for supporting information sharing by the shared information management server 100 and the progress control server 200. As the output apparatus 400, for example, an information processing apparatus including a display device that displays various screens and an input device that receives user operations, such as a personal computer or a smartphone, is used. Outputting of presentation information is performed by, for example, displaying a screen including presentation information on the display device of the output apparatus 400.

Hardware Configuration of Shared Information Management Server 100 and Progress Control Server 200

Figure 2:
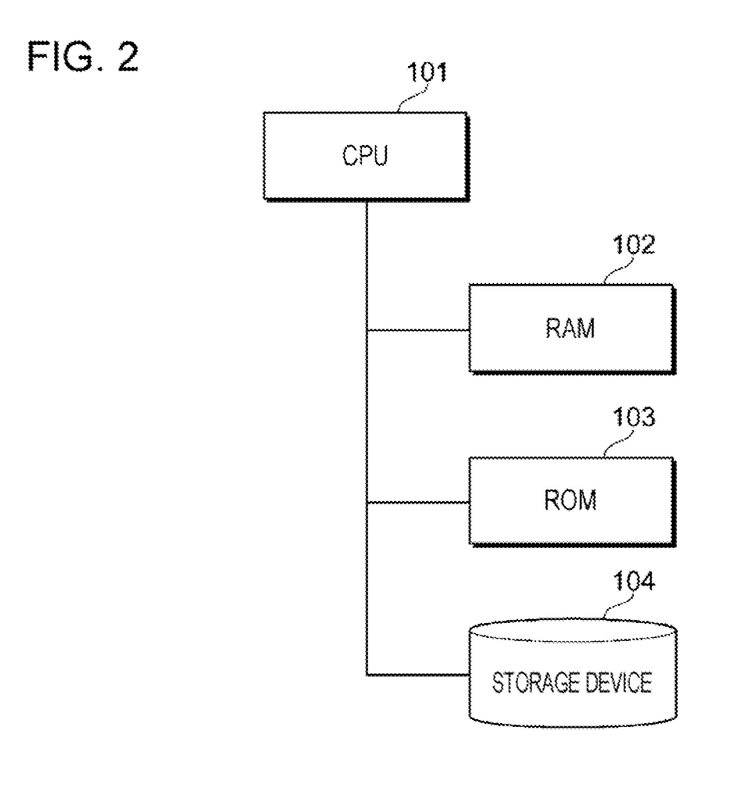
FIG. 2 is a diagram illustrating an exemplary hardware configuration of a shared information management server and a progress control server.

FIG. 2 is a diagram illustrating an exemplary hardware configuration of the shared information management server 100 and the progress control server 200. The shared information management server 100 and the progress control server 200 are realized by a computer, which includes a central processing unit (CPU) 101, which is an arithmetic processing unit, and random-access memory (RAM) 102, read-only memory (ROM) 103, and a storage device 104, which are storage units. The RAM 102 is a main storage device (main memory), and is used as work memory when the CPU 101 performs arithmetic processing. The ROM 103 stores programs and data such as prepared setting values. The CPU 101 may directly load programs and data from the ROM 103 and execute processing. The storage device 104 is a unit for saving programs and data. The storage device 104 stores a program, and the CPU 101 loads the program stored in the storage device 104 to the main storage device and executes the program. In addition, the storage device 104 stores and saves the result of processing performed by the CPU 101. As the storage device 104, for example, a magnetic disk device or a solid state drive (SSD) is used.

In the case where the shared information management server 100 and the progress control server 200 are realized by the above-described computer, for example, the individual functions of these servers, which will be described hereinafter, are realized by executing the program by the CPU 101. The shared information management server 100 and the progress control server 200 are realized as, for example, servers configured on a network. Note that these servers are not limited to configurations with a single piece of hardware (such as a server machine), and may be configured in a distributed manner as a plurality of pieces of hardware or virtual machines. In addition, the functions of the shared information management server 100 and the functions of the progress control server 200 may be realized by one server.

Functional Configuration of Shared Information Management Server 100 and Progress Control Server 200

Figure 3:
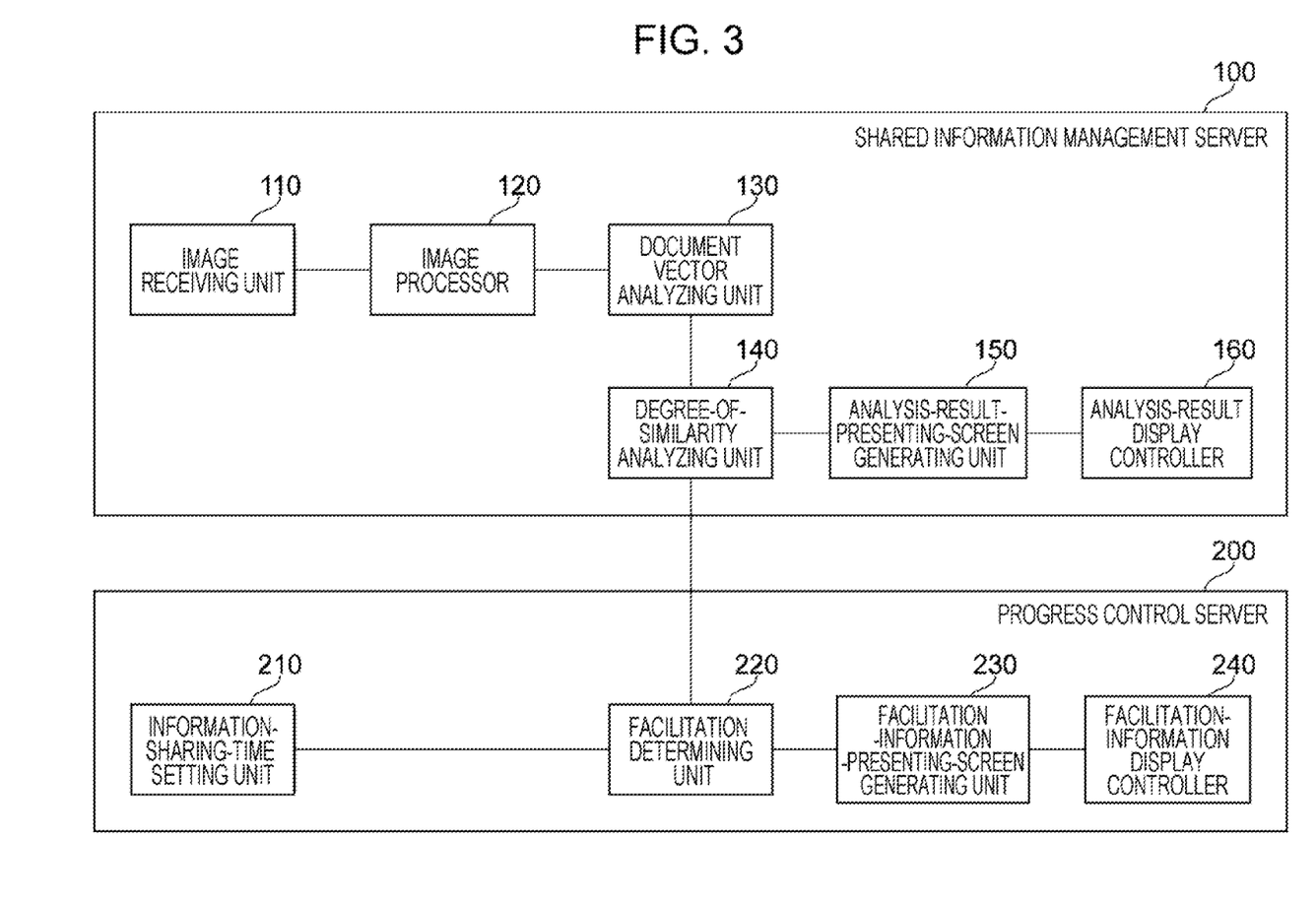
FIG. 3 is a diagram illustrating the functional configuration of the shared information management server and the progress control server.

FIG. 3 is a diagram illustrating the functional configuration of the shared information management server 100 and the progress control server 200. The shared information management server 100 includes an image receiving unit 110, an image processor 120, a document vector analyzing unit 130, a degree-of-similarity analyzing unit 140, an analysis-result-presenting-screen generating unit 150, and an analysis-result display controller 160. The progress control server 200 includes an information-sharing-time setting unit 210, a facilitation determining unit 220, a facilitation-information-presenting-screen generating unit 230, and a facilitation-information display controller 240.

Functions of Shared Information Management Server 100

The image receiving unit 110 receives, from the input apparatus 300, image data of a description form where to-be-shared information is described (hereinafter referred to as a document image). To-be-shared information is submitted by each participant of the group work. Therefore, the image receiving unit 110 obtains a plurality of documents where to-be-shared information is recorded.

Figure 10:
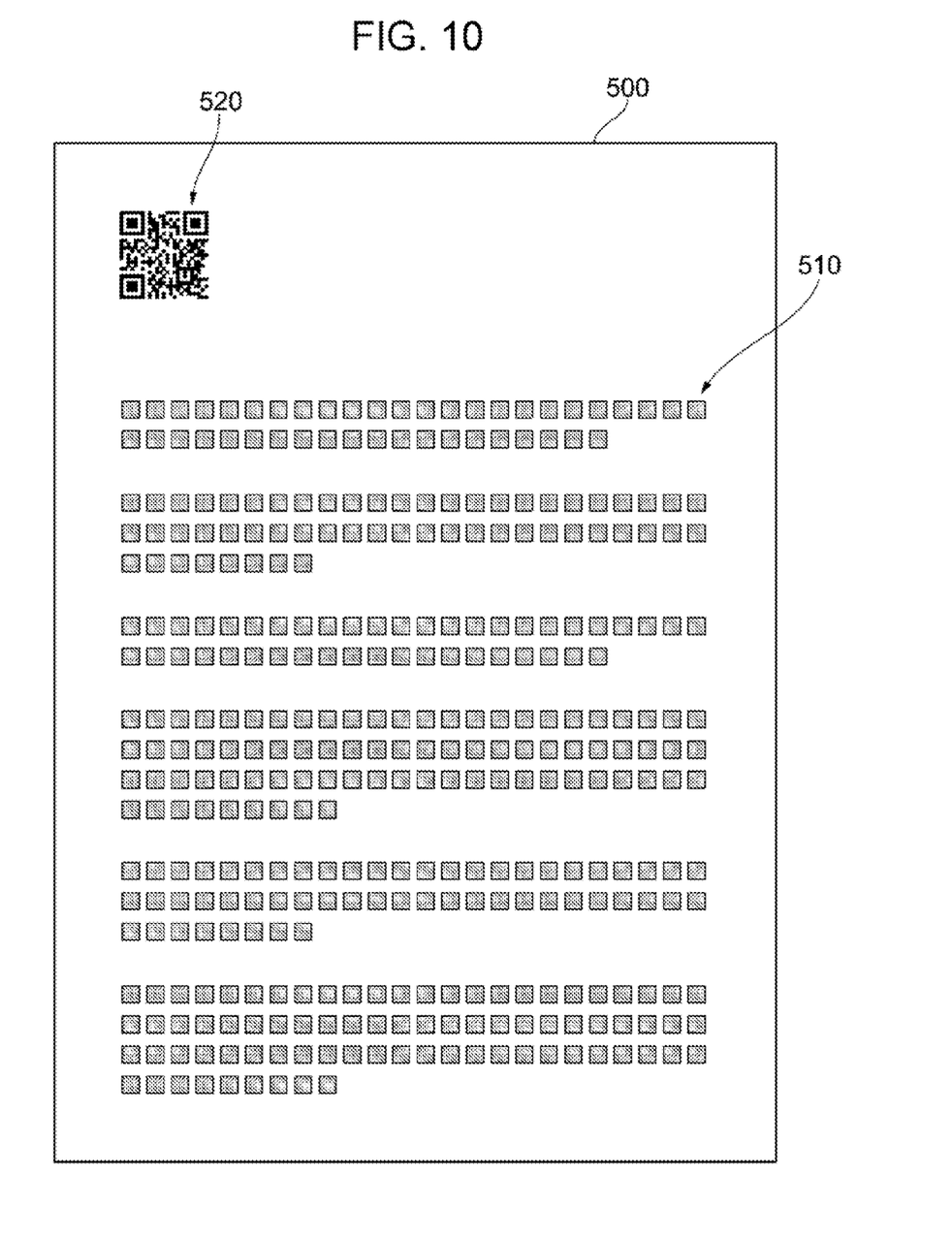
FIG. 10 is a diagram illustrating an example of the configuration of a description form where to-be-shared information is described.

FIG. 10 is a diagram illustrating an example of the configuration of a description form where to-be-shared information is described. By specifying the configuration of a description form 500 to some extent, the load of processing image data of the description form 500 obtained by the image receiving unit 110 is reduced. In the example illustrated in FIG. 10, the description form 500 includes a document field 510 and an information code 520.

The document field 510 is provided in a specified area of the space of the description form 500. A document indicating to-be-shared information is described in the document field 510. Although it is unnecessary to specify the style and the format of the document field 510, a document may be explicitly described in blocks such as paragraphs. The following description assumes that a document in the document field 510 is explicitly described in paragraphs.

The information code 520 is a code for recording information regarding the document and information regarding the author of the document. Examples of information regarding the document include the identification information (document ID) of the document, the document creation date and time, the document submission date and time, and the identification information of group work in which the details of the document are used as to-be-shared information. Examples of information regarding the author include the identification information (user ID) of a user who is the author of the document as well as a participant of the group work, and the identification information (group ID) of a group to which the user belongs. In the case where the group work is done in school class or the like, information regarding the author may include the student number of a student who is the user. These items of information may be recorded in the information code 520 itself, or link information for a server where these items of information are managed may be recorded as the information code 520. For example, a two-dimensional code or the like is used as the information code 520.

Referring back to FIG. 3, the image processor 120 processes a document image obtained by the image receiving unit 110. Specifically, the image processor 120 reads the information code 520 recorded in the document image. On the basis of information read from the information code 520, for example, the document image is sorted by group which implements group work in which the details of the document are used as to-be-shared information. In addition, the image processor 120 applies optical character recognition (OCR) to the document image to convert the document described in the document image to electronic data. The following processing is performed for each of groups to which documents are sorted.

The document vector analyzing unit 130 performs a document vector analysis of the document (electronic document) obtained by electronic data conversion performed by the image processor 120. Specifically, the document vector analyzing unit 130 divides the electronic document into paragraphs, and calculates a document vector for the description of each paragraph.

The degree-of-similarity analyzing unit 140 calculates the degree of similarity in described details in units of paragraphs of the electronic document on the basis of the document vector of each paragraph, which is calculated by the document vector analyzing unit 130. Specifically, the degree-of-similarity analyzing unit 140 calculates the degree of similarity of each paragraph in a document with all the paragraphs of all the other documents. This is performed for all the documents. The degree of similarity between paragraphs in the same document is not calculated. In other words, the degree-of-similarity analyzing unit 140 calculates the degree of similarity in details in units of paragraphs between different documents, in which the paragraphs are one example of blocks of sentences included in documents.

In addition, the degree-of-similarity analyzing unit 140 identifies a combination of paragraphs with the highest degree of similarity between documents, on the basis of the calculated degree of similarity between paragraphs of the individual documents. Specifically, at first, attention is paid to a paragraph of interest in a document of interest, and, among paragraphs of the other documents, a paragraph with the highest degree of similarity with the paragraph of interest is identified in units of documents. This is performed for each paragraph of the document of interest, and further for each document. Accordingly, in units of paragraphs in each document, a paragraph with the highest degree of similarity in each document different from the document including the paragraph is identified. The shared information management server 100 and the progress control server 200 regard a combination of paragraphs with the highest degree of similarity between documents as paragraphs describing the same theme, and treat these paragraphs as related paragraphs. For a paragraph of interest in a document of interest, there is a related paragraph in each document different from the document of interest including the paragraph of interest.

The analysis-result-presenting-screen generating unit 150 generates an analysis result presenting screen that presents the result of analyzing a document. The analysis-result-presenting-screen generating unit 150 generates, as an analysis result presenting screen, a graph indicating related paragraphs of each paragraph in each document on the basis of the relationship between paragraphs with the highest degree of similarity between documents, which is obtained as above. Specifically, the analysis-result-presenting-screen generating unit 150 generates a graph in which each paragraph in each document is set as a vertex (node), and a side (edge) is formed between vertices on the basis of the relation based on the degree of similarity between paragraphs. Each side of the graph may be weighted according to the degree of similarity between corresponding paragraphs. The weight added to each side may be represented by, for example, the thickness or length of the side. In addition, the value of the degree of similarity may be displayed at each side. In addition, the vertices of the graph may be rendered in a size corresponding to the size of document vectors calculated in analysis conducted by the document vector analyzing unit 130.

The analysis-result display controller 160 transmits an analysis result presenting screen generated by the analysis-result-presenting-screen generating unit 150 to the output apparatus 400, and displays the analysis result presenting screen. The analysis result presenting screen displayed on the output apparatus 400 is used also as a user interface (UI) screen for receiving an operation performed by a user who is a participant of the group work. The user may operate an input device such as a mouse or a touchscreen to update the graph on the analysis result presenting screen displayed on the output apparatus 400. For example, each side formed between vertices of the graph may be replaced or vertices may be moved. When each side of the graph is replaced, the analysis-result display controller 160 notifies the degree-of-similarity analyzing unit 140 of the operation details. The degree-of-similarity analyzing unit 140 updates information on the relation between paragraphs in accordance with the received operation details.

Functions of Progress Control Server 200

The information-sharing-time setting unit 210 of the progress control server 200 sets work time for performing the work of sharing information by participants of the group work. This setting is performed by, for example, the organizer of the group work. In the case where the group work is done in school class or the like, a teacher may set the work time beforehand. In addition, it is only necessary for the setting of the work time to be done before the operation of the later-described facilitation determining unit 220 starts.

The facilitation determining unit 220 determines the target of the sharing work, among combinations of related paragraphs identified by the shared information management server 100, and sets the time and the order of performing the sharing work for the combinations of related paragraphs determined as the target of the sharing work. At first, the facilitation determining unit 220 determines related paragraphs that serve as the target of the sharing work. Specifically, attention is paid to a paragraph of interest in a document of interest, and, among related paragraphs of the paragraph of interest, a related paragraph with the lowest degree of similarity is determined as the target of the sharing work regarding the paragraph of interest. This is performed for each paragraph of the document of interest, and further for each document. Accordingly, in units of paragraphs in each document, a related paragraph that serves as the target of the sharing work is determined. Here, a related paragraph with the lowest degree of similarity is determined as the target of the sharing work because a related paragraph with a lower degree of similarity with a paragraph of interest is more likely to contain details that are not described in the paragraph of interest, and it is thus worth doing the sharing work. If a related paragraph has an extremely low degree of similarity, it is more likely that the related paragraph contains no description on the common theme. To this end, a threshold may be set, and, among related paragraphs whose degrees of similarity are higher than the threshold, a related paragraph with the lowest degree of similarity may be determined as the target of the sharing work. Furthermore, in the case where all the related paragraphs of a certain paragraph have very high degrees of similarity and their descriptions contain substantially the same details, it is conceivable that there is little original information in the related paragraphs, and it is thus less worth doing the sharing work. To this end, another threshold different from the above threshold may be set, and, in the case where all the related paragraphs have degrees of similarity that are higher than the threshold, these related paragraphs may be excluded from being the target of the sharing work. Note that the specific method of doing the sharing work is not particularly limited. Mainly, the specific method may be presentation of details described in a related paragraph. The following methods are individually selectable and implementable according to the details of the group work or the attribute of the group: distribution of a document, distribution to the participants' terminals, and displaying on a display device viewable by the participants at the same time.

In addition, the facilitation determining unit 220 allocates, for a related paragraph that serves as the target of the sharing work, work time determined according to the number of characters in the related paragraph. Specifically, for example, in the case where a presentation is performed as the sharing work, a presentation time of one minute per 200 characters may be allocated. The allocated work time may serve as the upper limit. That is, the work may be completed in a time shorter than the allocated time, and, in that case, the work of sharing the next related paragraph may be performed ahead of schedule.

In addition, the facilitation determining unit 220 determines the work order of performing the sharing work for related paragraphs determined as the target of the sharing work. This order is defined as the ascending order of degree of similarity. The facilitation determining unit 220 compares the cumulative time in the case where the sharing work is performed in the work order and with the work time allocated to each related paragraph and the cumulative time of the entire sharing work set by the information-sharing-time setting unit 210, and determines related paragraphs for which the sharing work is to be actually performed so that the cumulative time will fall within the entire work time.

The facilitation-information-presenting-screen generating unit 230 generates a facilitation information presenting screen for presenting the above-described facilitation information, which is the result of determination performed by the facilitation determining unit 220. The facilitation information includes the identification information of paragraphs serving as the target of the work, the work order, and the work time for each paragraph. The facilitation-information-presenting-screen generating unit 230 generates, for example, a list of identification information and work time of paragraphs, which are arranged in the work order, as a facilitation information presenting screen.

The facilitation-information display controller 240 transmits a facilitation information presenting screen generated by the facilitation-information-presenting-screen generating unit 230 to the output apparatus 400, and displays the facilitation information presenting screen. In the case where a facilitation information presenting screen is generated as the above-mentioned list, the facilitation-information display controller 240 may display items of related paragraphs in a range in which the cumulative time falls within the entire work time so as to be distinguishable from items of the other related paragraphs. In addition, the facilitation-information display controller 240 may display items of related paragraphs for which the sharing work has been completed so as to be distinguishable from items of the other related paragraphs.

Example of Degree-of-Similarity Analysis

Figure 4:
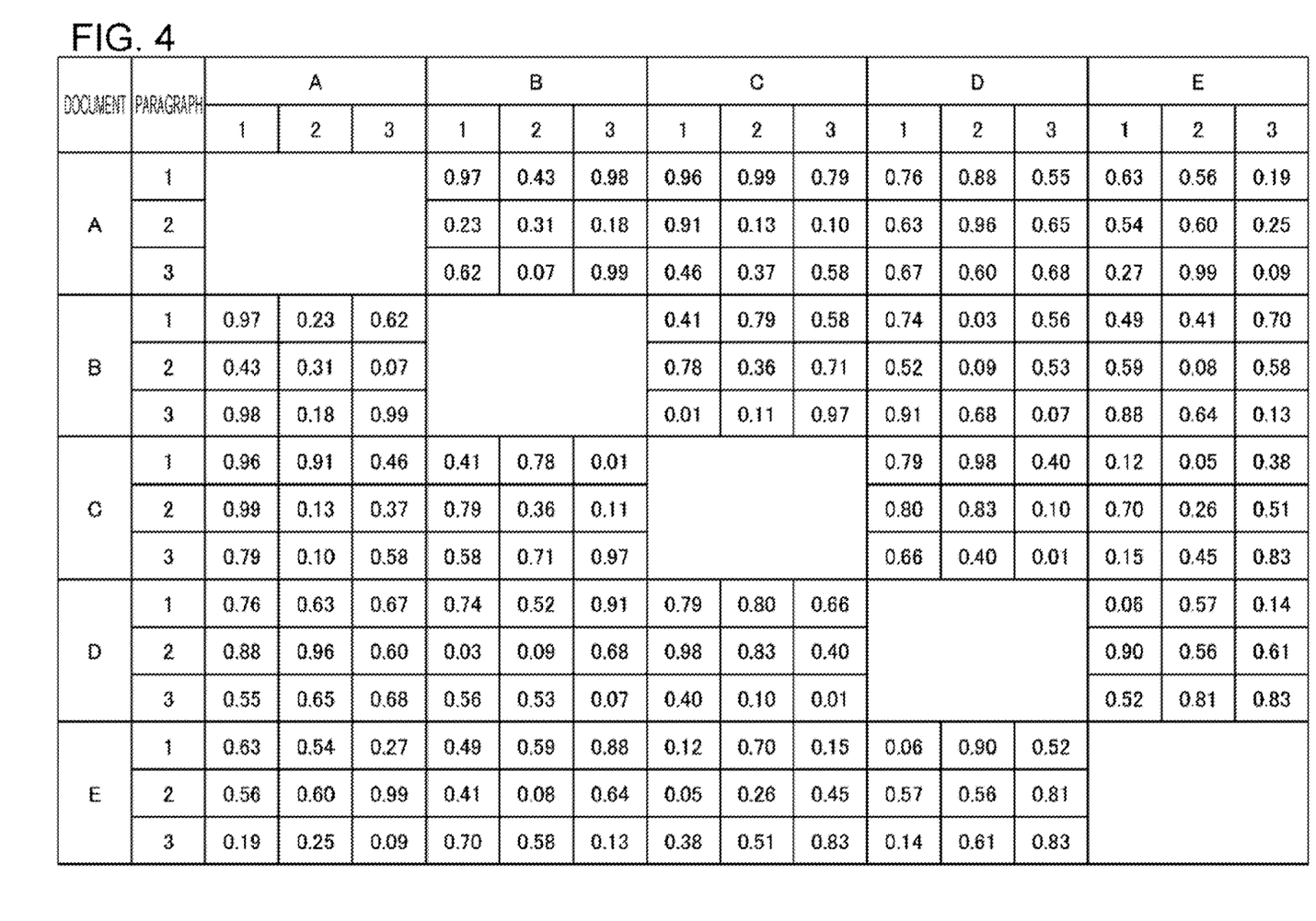
FIG. 4 is a diagram illustrating an example of the degree of similarity in units of paragraphs, calculated by a degree-of-similarity analyzing unit of the shared information management server.

FIG. 4 is a diagram illustrating an example of the degree of similarity, in units of paragraphs, calculated by the degree-of-similarity analyzing unit 140 of the shared information management server 100. In the example illustrated in FIG. 4, the degree of similarity of each paragraph in each document is calculated for five documents including document A to document E. The documents A to E are each composed of three paragraphs. In FIG. 4, attention is paid to paragraphs 1 to 3 of the document A. When attention is paid to the degree of similarity between the paragraph 1 and each paragraph of the document B, the degree of similarity with the paragraph 3 of the document B is 0.98, which is the highest. When attention is paid to the degree of similarity between the paragraph 1 and each paragraph of the document C, the degree of similarity with the paragraph 2 of the document C is 0.99, which is the highest. When attention is paid to the degree of similarity between the paragraph 1 and each paragraph of the document D, the degree of similarity with the paragraph 2 of the document D is 0.88, which is the highest. When attention is paid to the degree of similarity between the paragraph 1 and each paragraph of the document E, the degree of similarity with the paragraph 1 of the document E is 0.63, which is the highest. Therefore, the related paragraphs of the paragraph 1 of the document A are the paragraph 3 of the document B, the paragraph 2 of the document C, the paragraph 2 of the document D, and the paragraph 1 of the document E. Similarly, the related paragraphs of the paragraph 2 of the document A are the paragraph 2 of the document B, the paragraph 1 of the document C, the paragraph 2 of the document D, and the paragraph 2 of the document E. In addition, the related paragraphs of the paragraph 3 of the document A are the paragraph 3 of the document B, the paragraph 3 of the document C, the paragraph 3 of the document D, and the paragraph 2 of the document E.

Furthermore, when attention is paid to the paragraphs 1 to 3 of the document B, the related paragraphs of the paragraph 1 of the document B are the paragraph 1 of the document A, the paragraph 2 of the document C, the paragraph 1 of the document D, and the paragraph 3 of the document E. In addition, the related paragraphs of the paragraph 2 of the document B are the paragraph 1 of the document A, the paragraph 1 of the document C, the paragraph 3 of the document D, and the paragraph 1 of the document E. In addition, the related paragraphs of the paragraph 3 of the document B are the paragraph 3 of the document A, the paragraph 3 of the document C, the paragraph 1 of the document D, and the paragraph 1 of the document E. In this manner, related paragraphs are obtained for each of the paragraphs 1 to 3 of the documents C to E.

Here, the relation between paragraphs is not necessarily symmetric. That is, a combination of a paragraph in a first document and its most similar paragraph in a second document need not match a combination of that paragraph in the second document and its most similar paragraph in the first document. For example, looking at the document B from the document A, a paragraph of the document B that is the most similar to the paragraph 1 of the document A is the paragraph 3. However, a paragraph of the document A that is the most similar to the paragraph 3 of the document B is the paragraph 3, not the paragraph 1. In addition, a paragraph of the document B that is the most similar to the paragraph 2 of the document A is the paragraph 2. However, a paragraph of the document A that is the most similar to the paragraph 2 of the document B is the paragraph 1, not the paragraph 2. In contrast, looking at the document A from the document B, a paragraph of the document A that is the most similar to the paragraph 1 of the document B is the paragraph 1. In addition, a paragraph of the document A that is the most similar to the paragraph 2 of the document B is also the paragraph 1. However, a paragraph of the document B that is the most similar to the paragraph 1 of the document A is the document 3, as has been described above, not the paragraph 1 or the paragraph 2.

Example of Analysis Result Presenting Screen

Figure 5:
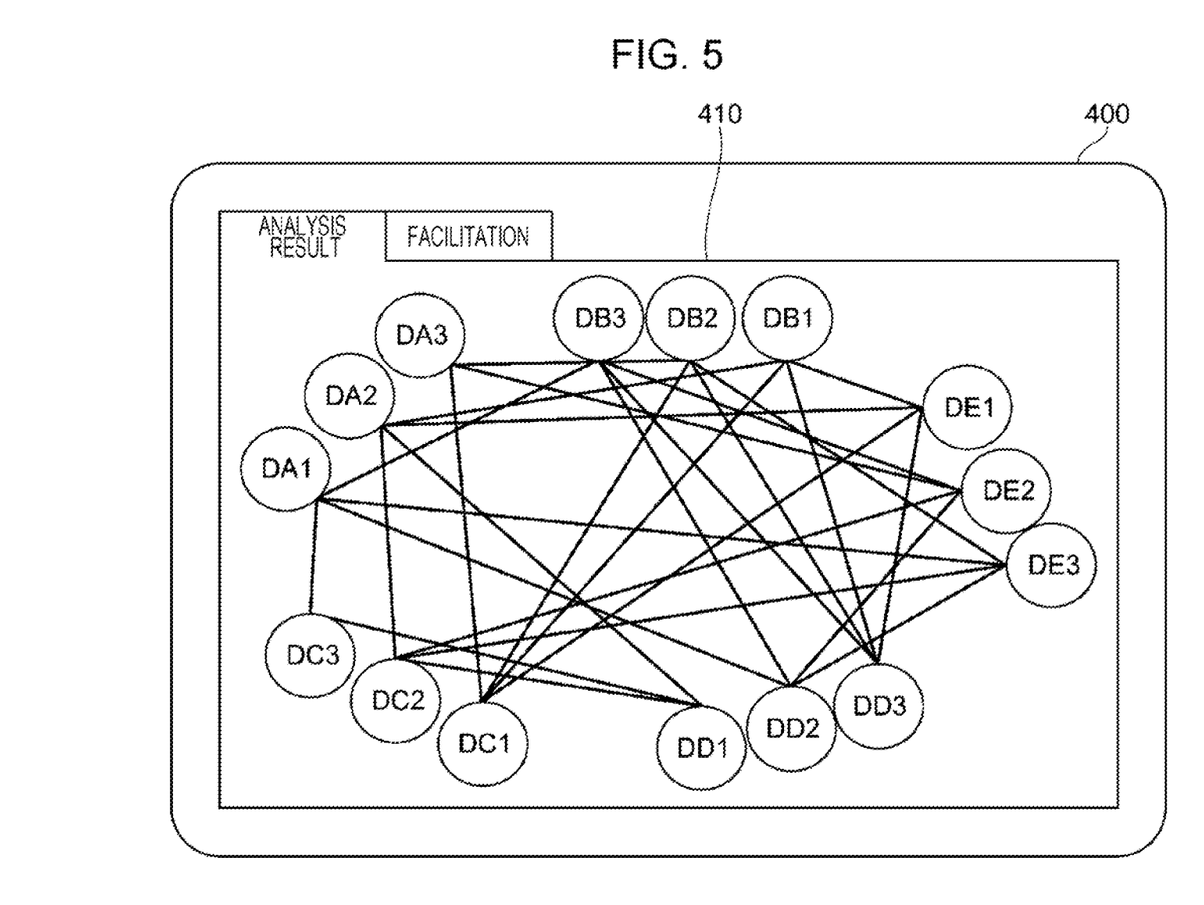
FIG. 5 is a diagram illustrating an example of an analysis result presenting screen generated by an analysis-result-presenting-screen generating unit of the shared information management server.

FIG. 5 is a diagram illustrating an example of an analysis result presenting screen generated by the analysis-result-presenting-screen generating unit 150 of the shared information management server 100. An analysis result presenting screen 410 is displayed on the output apparatus 400. The vertices of a graph on the analysis result presenting screen 410 illustrated in FIG. 5 correspond to the documents and paragraphs illustrated in FIG. 4. For example, "DA" of the vertex "DA1" indicates the document A, and "1" indicates the paragraph 1. In addition, the vertices are arranged in groups of documents in the example illustrated in FIG. 5. Note that, in the example illustrated in FIG. 5, each side formed between vertices is merely an example, and does not reflect similarity between paragraphs illustrated in FIG. 4. For example, the vertex "DA1" is connected to the vertex "DB3", the vertex "DC3", the vertex "DD2", and the vertex "DE3", which are different from the related paragraphs (the paragraph 3 of the document 3, the paragraph 2 of the document C, the paragraph 2 of the document D, and the paragraph 1 of the document E) of the paragraph 1 of the document A illustrated with reference to FIG. 4.

Because FIG. 5 merely illustrates an example of display of the analysis result presenting screen 410, for the sake of simplicity, the graph is an undirected graph where each side has no direction. Actually, however, as described above, the relation between paragraphs is not symmetric. Thus, the graph on the analysis result presenting screen 410 is created as, for example, a directed graph. In this case, each side is described as an arrow directed from one vertex to another vertex in accordance with the relation between paragraphs. In addition, in the example illustrated in FIG. 5, in the case where the user selects a vertex on the analysis result presenting screen displayed on the output apparatus 400 by performing an operation such as clicking, the display screen of the output apparatus 400 is switched to display a paragraph corresponding to the selected vertex.

Example of Determining Target of Sharing Work

Figure 6:
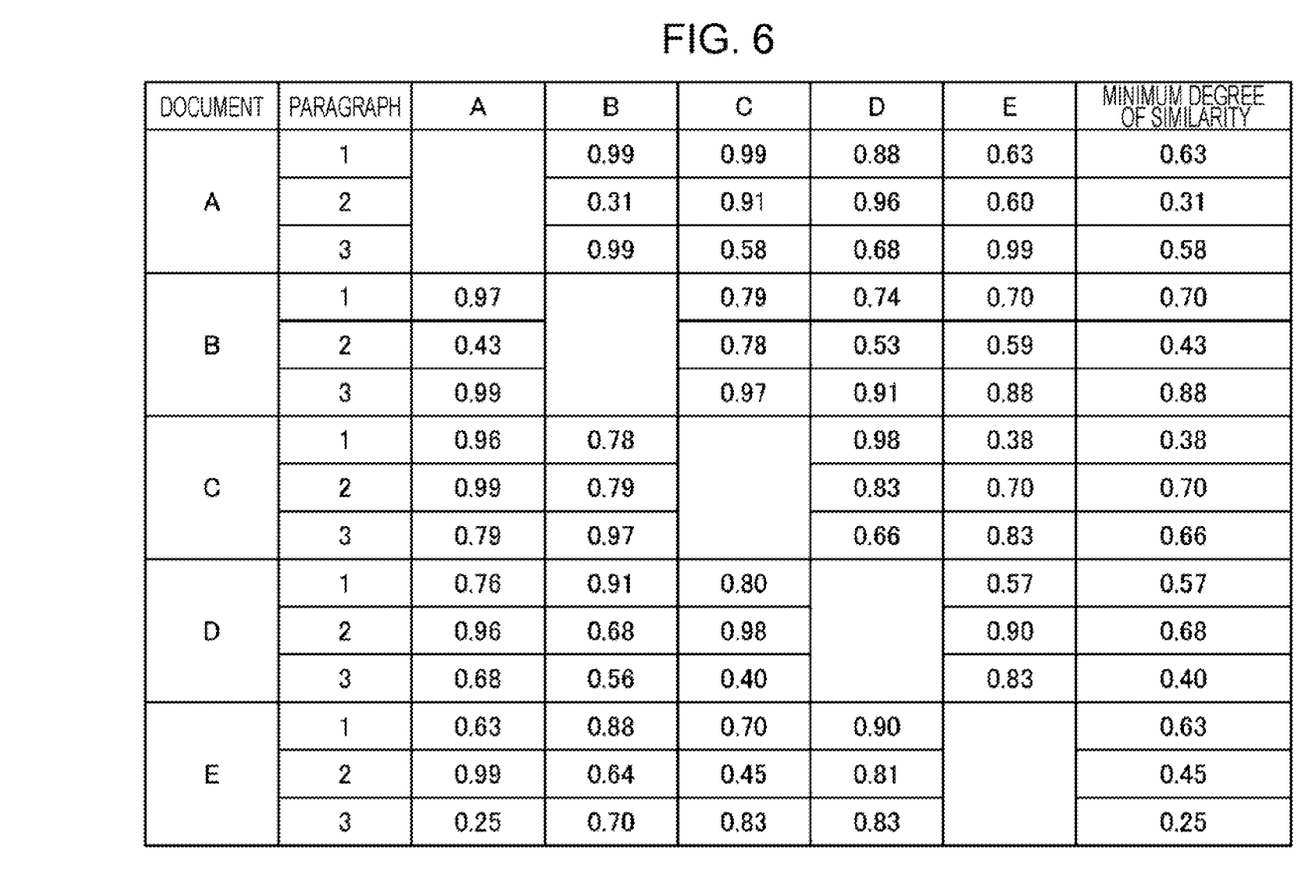
FIG. 6 is a diagram illustrating an example in which the target of the sharing work is determined by a facilitation determining unit of the progress control server.

FIG. 6 is a diagram illustrating an example in which the target of the sharing work is determined by the facilitation determining unit 220 of the progress control server 200. FIG. 6 illustrates the degree of similarity of each of the related paragraphs with each of the paragraphs 1 to 3 of the documents A to E. For a paragraph of interest, there is only one related paragraph in each document. In FIG. 6, paragraphs are omitted in a document including a related paragraph serving as the target of comparison. The degree of similarity between each of the paragraphs 1 to 3 in each of the documents A to E and each related paragraph, illustrated in FIG. 6, is based on the example illustrated in FIG. 4.

As described above, the facilitation determining unit 220 determines, among related paragraphs, a related paragraph with the lowest degree of similarity as the target of the sharing work. In FIG. 6, when attention is paid to the paragraph 1 of the document A, the degree of similarity with (the paragraph 3 of) the document B is 0.99; the degree of similarity with (the paragraph 2 of) the document C is 0.99; the degree of similarity with (the paragraph 2 of) the document D is 0.88; and the degree of similarity with (the paragraph 1 of) the document E is 0.63. Therefore, because 0.63 is the lowest degree of similarity, the paragraph 1 of the document E serves as the target of the sharing work. Similarly, a related paragraph that serves as the target of the sharing work is determined for each of the paragraph 2 and the paragraph 3 of the document A, the paragraphs 1 to 3 of the document B, the paragraphs 1 to 3 of the document C, the paragraphs 1 to 3 of the document D, and the paragraphs 1 to 3 of the document E.

Figure 7:
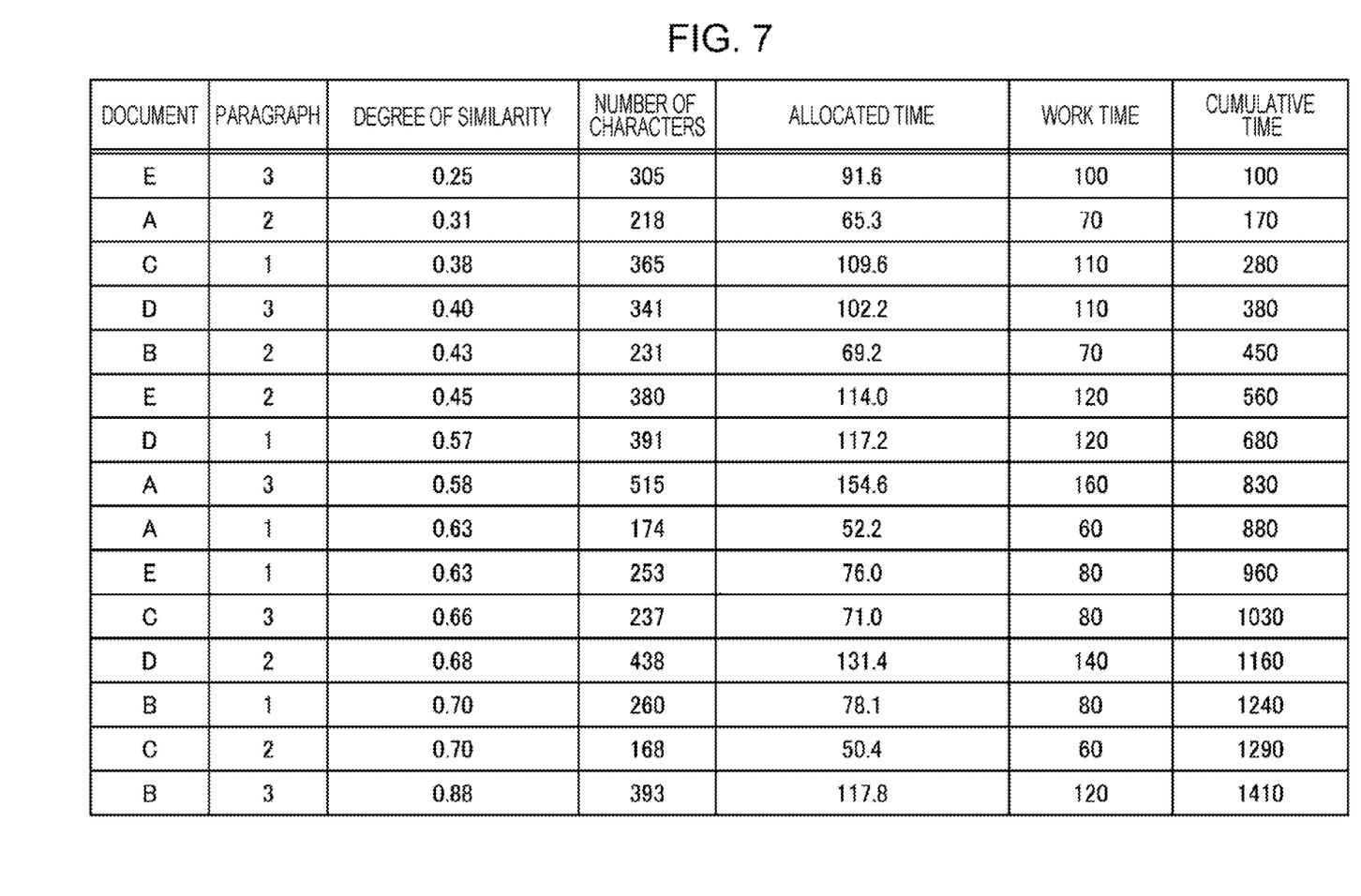
FIG. 7 is a diagram illustrating an example of determination information for a related paragraph of the target of the sharing work.

Determination Information for Related Paragraph Serving as Target of Sharing Work FIG. 7 is a diagram illustrating an example of determination information for a related paragraph serving as the target of the sharing work. In the example illustrated in FIG. 7, the following items of information are recorded for each related paragraph: the identification information of "document" and "paragraph", "degree of similarity", and "number of characters", "allocated time", "work time", and "cumulative time" of the paragraph. "Document" is the identification information of a document including the related paragraph, and "paragraph" is the identification information of the related paragraph. Here, information for identification to be performed by the facilitation determining unit 220 is recorded. "Degree of similarity" is the degree of similarity of the related paragraph. "Number of characters" is the number of characters described in the related paragraph. "Allocated time" is time allocated by the facilitation determining unit 220 for the work of sharing the related paragraph. This "allocated time" is a value calculated on the basis of the number of characters in the related paragraph. Here, the allocated time is calculated on the basis of 60 seconds per 200 characters. "Work time" is time allocated for the related paragraph in order to actually implement the sharing work within the preset work time of the entire sharing work. Because the entire work time is often set in minutes or the like, here, a fraction of the time indicated in "allocated time" is rounded up to a multiple of ten. "Cumulative time" is the accumulated "work time" in order from the top related paragraph. In addition, related paragraphs are arranged from the top in ascending order of degree of similarity. In the case where the work time of the entire sharing work is set to 15 minutes, with reference to "cumulative time" in FIG. 7, if the work of sharing the tenth related paragraph (document E, paragraph 1) is performed, the time exceeds the set time of 900 seconds (15 minutes). Thus, the sharing work is performed up to the ninth related paragraph (document A, paragraph 1).

Example of Facilitation Information Presenting Screen

Figure 8:
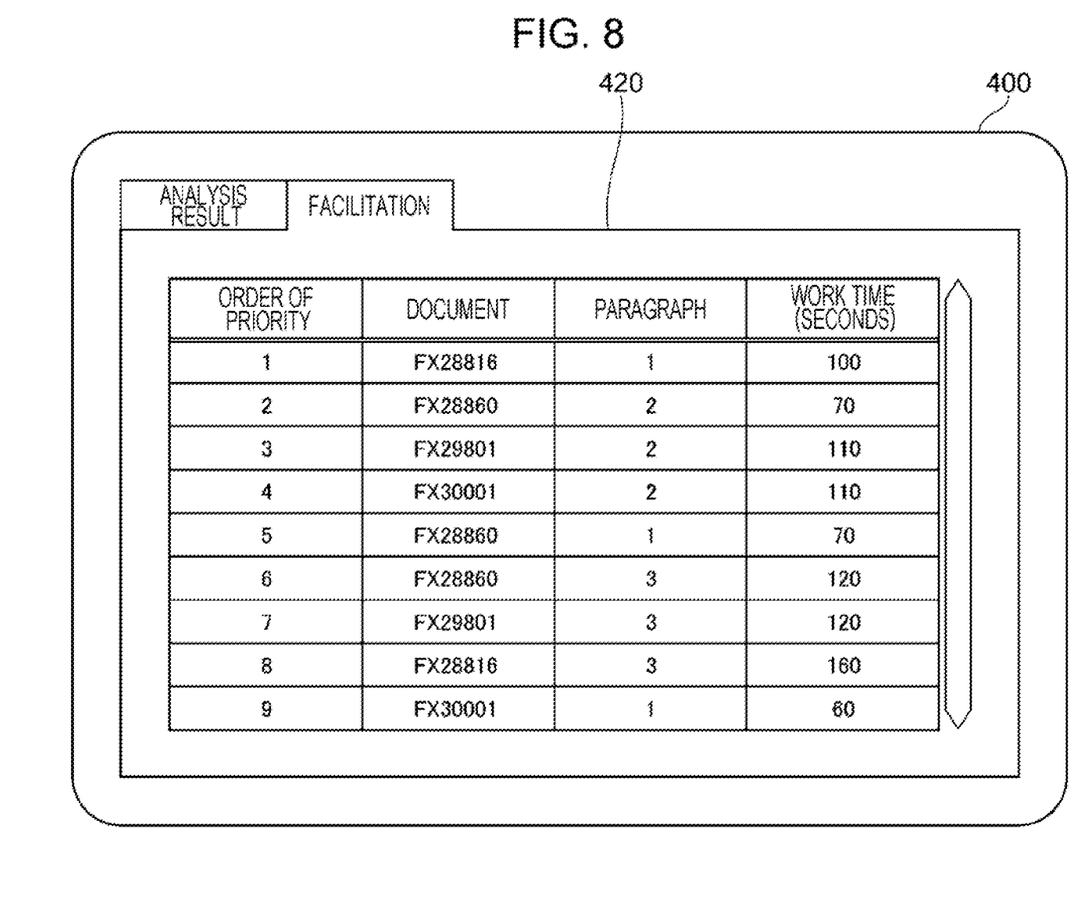
FIG. 8 is a diagram illustrating an example of a facilitation information presenting screen generated by a facilitation-information-presenting-screen generating unit.

FIG. 8 is a diagram illustrating an example of a facilitation information presenting screen generated by the facilitation-information-presenting-screen generating unit 230. A facilitation information presenting screen 420 is displayed on the output apparatus 400. The facilitation information presenting screen 420 illustrated in FIG. 8 indicates related paragraphs up to the ninth related paragraph of the determination information illustrated in FIG. 7 as the target of the sharing work, which are in the order (work order) of the related paragraphs in FIG. 8. On the facilitation information presenting screen 420 illustrated in FIG. 8, the following items of information are displayed for the related paragraphs serving as the target of the sharing work: "order of priority", the identification information of "document", the identification information of "paragraph", and "work time". "Order of priority" is the order of implementing the sharing work, which is determined by the facilitation determining unit 220 on the basis of the degree of similarity of each related paragraph. The identification information of "document" is the identification information of a document including the related paragraph. Unlike the identification information illustrated in FIG. 7, this is information for a user who looks at the facilitation information presenting screen 420 to identify the document. For example, the document file name or the identification information of a user who is the author of the document is used. Like the identification information of "document", the identification information of "paragraph" is information for a user who looks at the facilitation information presenting screen 420 to identify the paragraph. The work time illustrated in FIG. 7 is recorded in "work time". On the facilitation information presenting screen 420 illustrated in FIG. 8, if the user selects the row of a related paragraph that serves as the target of the work, the display of the output apparatus 400 is switched to display the selected related paragraph.

Example of Related Paragraph Displaying Screen

Figure 9:
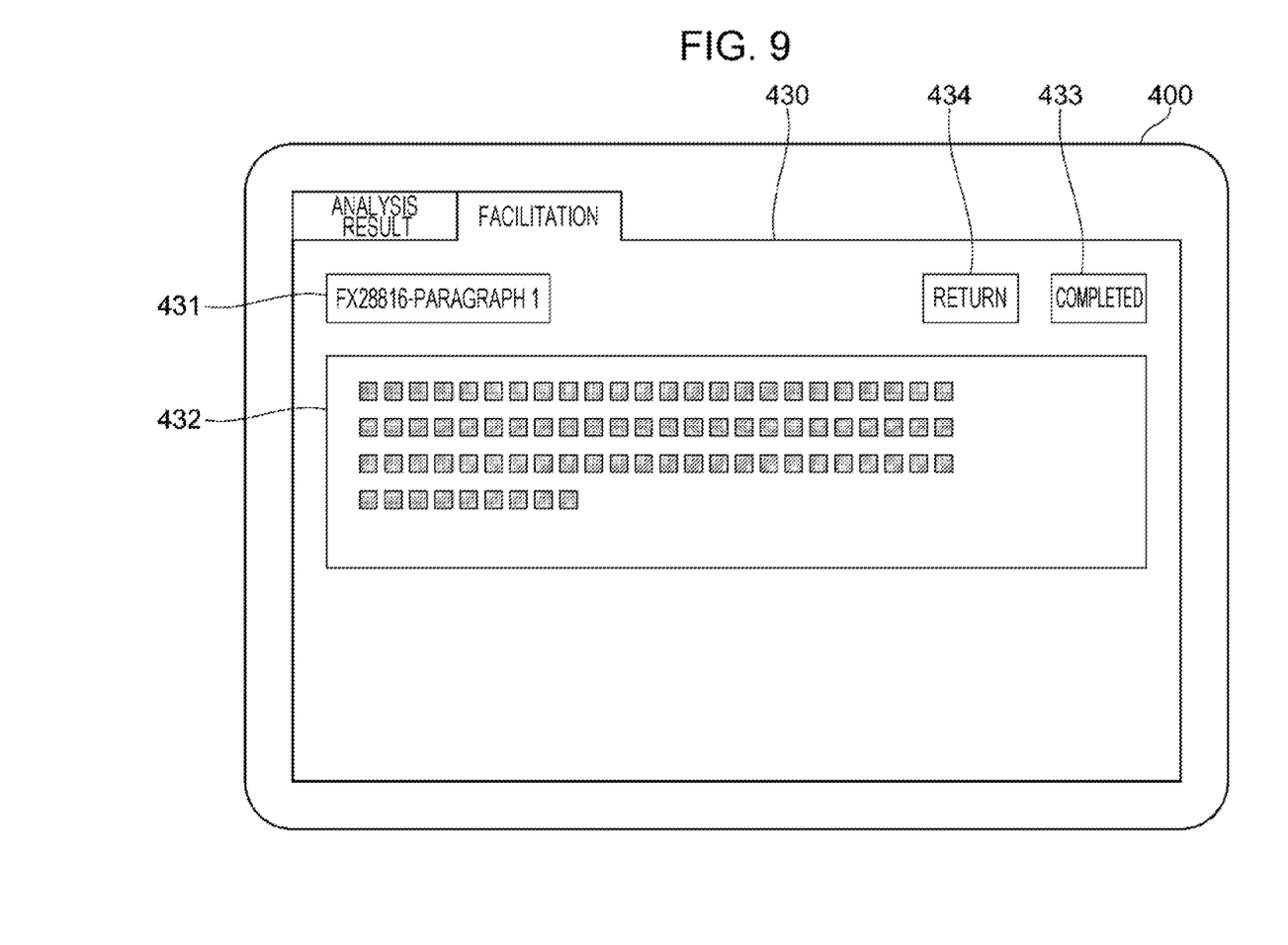
FIG. 9 is a diagram illustrating an example of a related paragraph displaying screen.

FIG. 9 is a diagram illustrating an example of a related paragraph displaying screen. A related paragraph displaying screen 430 displayed on the output apparatus 400 is provided with a target information field 431, a related paragraph displaying area 432, and button objects 433 and 434. The target information field 431 indicates information for identifying a displayed related paragraph. In the example illustrated in FIG. 9, information described in the item "document" and the item "paragraph" on the facilitation information presenting screen illustrated in FIG. 8 is displayed to identify the document and the paragraph. That is, it is illustrated that the paragraph 1 of the document FX28816 is displayed on the related paragraph displaying screen 430 illustrated in FIG. 9. Sentences described in the related paragraph are displayed in the related paragraph displaying area 432.

The button object 433 indicated as "completed" is an object for confirming that the work of sharing the related paragraph displayed on the related paragraph displaying screen 430 has been completed. In response to an operation (clicking the mouse, for example) on the button object 433, a command for notifying that the sharing work has been completed is output to the progress control server 200. On receipt of the command, the progress control server 200 updates the status of the related paragraph displayed on the related paragraph displaying screen 430 to details indicating that the sharing work has been completed, and returns the display of the output apparatus 400 to the facilitation information presenting screen 420. At this time, on the facilitation information presenting screen 420, the row of the related paragraph for which the sharing work has been completed is displayed distinguishably from the other related paragraphs by changing the display color of the row, for example.

The button object 434 indicated as "return" is an object for returning to the facilitation information presenting screen 420 without completing the work of sharing the related paragraph displayed on the related paragraph displaying screen 430. In response to an operation (clicking the mouse, for example) on the button object 434, a command for ending the display without completing the sharing work is output to the progress control server 200. On receipt of the command, the progress control server 200 returns the display of the output apparatus 400 to the facilitation information presenting screen 420 without updating the status of the related paragraph displayed on the related paragraph displaying screen 430. At this time, the work of sharing the related paragraph displayed on the related paragraph displaying screen 430 is not completed, and therefore, the display mode of the row of the corresponding related paragraph on the facilitation information presenting screen 420 is not changed.

The configuration of the analysis result presenting screen 410 illustrated in FIG. 5, the configuration of the facilitation information presenting screen 420 illustrated in FIG. 8, and the configuration of the related paragraph displaying screen 430 illustrated in FIG. 9 are all examples, and are not limited to the illustrated configurations as long as they are screens including information and functions required at each stage. For example, although the work time of each related paragraph is presented on the facilitation information presenting screen 420 illustrated in FIG. 8, alternatively or additionally, the cumulative time illustrated in FIG. 7 may be presented. In the above-described example, the row of a related paragraph for which the sharing work has been completed is distinguishably displayed on the facilitation information presenting screen 420. In addition, if the time allocated to each related paragraph has elapsed, the corresponding row on the facilitation information presenting screen 420 may be distinguishably displayed. On the facilitation information presenting screen 420, a row selectable for displaying the related paragraph displaying screen 430 may be limited to that in the order indicated in "order of priority", or a row may be selectable regardless of the order indicated in "order of priority". Furthermore, selection of the row of a related paragraph for which the sharing work has been completed may be limited.

Although the exemplary embodiment of the present disclosure has been described above, the technical scope of the present disclosure is not limited to the above-described exemplary embodiment. For example, although to-be-shared information is described in the description form 500 (see FIG. 10) and is read by the input apparatus 300 in the above-described exemplary embodiment, a document describing to-be-shared information may be created as an electronic document using a personal computer or another information processing apparatus, and the document may be directly input to the shared information management server 100. In addition, various changes or replacements of configurations that do not depart from the scope of the technical idea of the present disclosure are included in the present disclosure.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to analyze an obtained document, the processor being configured to:
obtain a plurality of documents where information to be shared by a plurality of participants is recorded,
calculate a degree of similarity in details in units of blocks between different documents, the blocks being blocks of sentences included in the documents,
determine an execution order of executing work of sharing details of each of the blocks on the basis of the degree of similarity, and
allocate work time for performing the work of sharing details of each of the blocks on the basis of a number of characters in each of the blocks.

2. The information processing system according to claim 1, wherein the processor calculates a vector degree of similarity of a document vector representing one or more sentences included in each of the blocks as a vector, and regards the calculated vector degree of similarity as the degree of similarity in details described in each of the blocks.

3. The information processing system according to claim 2, wherein the processor regards blocks with a highest degree of similarity between different documents as related blocks, and regards one of the related blocks as a target of the sharing work.

4. The information processing system according to claim 3, wherein the processor regards a block with a lowest degree of similarity among the related blocks as a target of the sharing work.

5. The information processing system according to claim 4, wherein the processor excludes, among the related blocks, one or more blocks whose degrees of similarity are lower than a predetermined threshold from being a target of the sharing work.

6. The information processing system according to claim 1, wherein the processor:
relates blocks with a highest degree of similarity between different documents,
presents information indicating relation between the blocks to the participants, and
on receipt of a command from any of the participants, updates the information indicating relation between the blocks.

7. The information processing system according to claim 6, wherein the processor:
displays, on a display device, a graph in which the blocks are set as vertices and a side is formed between vertices representing the blocks that are related, and
receives an operation performed by any of the participants for replacing the side, and, in accordance with the replaced side, updates the information indicating relation between the blocks.

8. The information processing system according to claim 1, wherein the processor presents to the participants the execution order and the work time of executing the work of sharing the blocks, and a cumulative value of the work time in a case where the sharing work is executed in the execution order.

9. The information processing system according to claim 8, wherein the processor distinguishably presents information on one or more blocks of which the cumulative value of the work time is included in a range less than or equal to a predetermined upper limit.

10. The information processing system according to claim 9, wherein the processor distinguishably presents information on one or more blocks for which the sharing work has been completed.

11. An information processing system comprising:
processing means for analyzing an obtained document, the processing means:
obtaining a plurality of documents where information to be shared by a plurality of participants is recorded,
calculating a degree of similarity in details in units of blocks between different documents, the blocks being blocks of sentences included in the documents,
determining an execution order of executing work of sharing details of each of the blocks on the basis of the degree of similarity, and
allocating work time for performing the work of sharing details of each of the blocks on the basis of a number of characters in each of the blocks.

* * * * *